No. 675,312. Patented May 28, 1901.
H. A. WOOD.
VALVE OR TAP.
(Application filed Sept. 13, 1900.)
(No Model.)
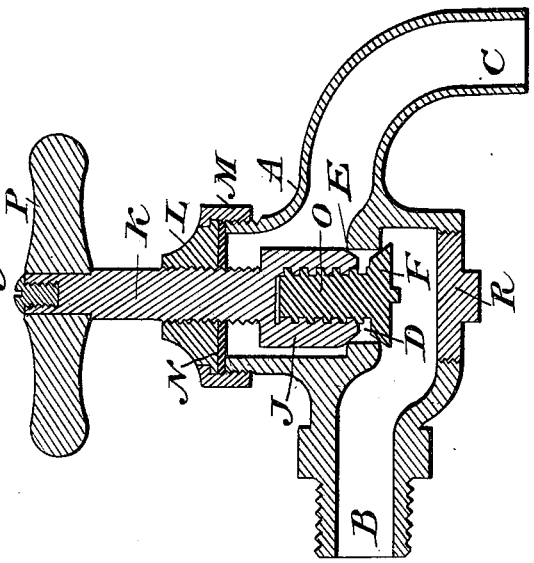
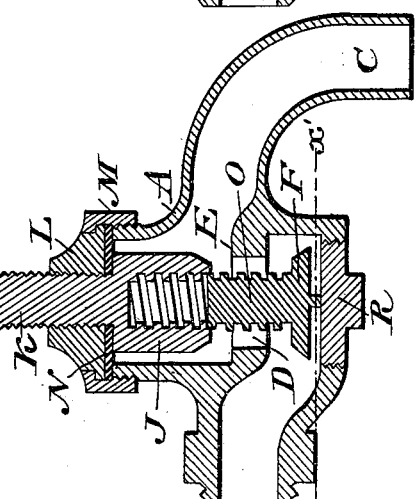
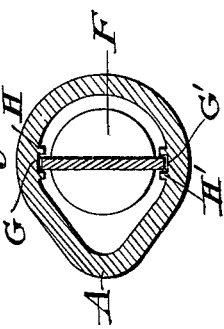
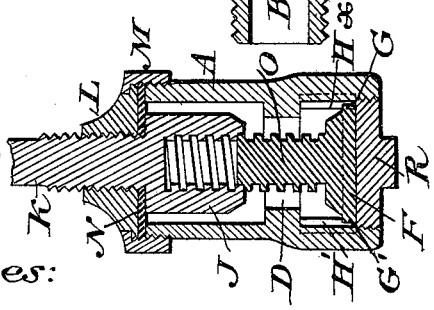
Witnesses:
Francis King
Geo. H. Smythe
Inventor:
Henry Alfred Wood

UNITED STATES PATENT OFFICE.

HENRY ALFRED WOOD, OF KINGSTON, CANADA, ASSIGNOR OF TWO-THIRDS TO ARCHIBALD P. KNIGHT AND FRANCIS KING, OF SAME PLACE.

VALVE OR TAP.

SPECIFICATION forming part of Letters Patent No. 675,312, dated May 28, 1901.

Application filed September 13, 1900. Serial No. 29,982. (No model.)

*To all whom it may concern:*

Be it known that I, HENRY ALFRED WOOD, a citizen of the United States, residing at Kingston, in the county of Frontenac and Province of Ontario, in the Dominion of Canada, have invented certain new and useful Improvements in Valves or Taps, of which the following is a specification.

My invention relates to valves and taps adapted to control water, steam, or any gas or liquid other than atmospheric air; and it consists in the employment of valves proper or plugs made of suitable material, preferably metal, and having conical or tapered surfaces for contact with the valve-seats and valve-seats formed so as to present only their inner circular edges or lips to the conical valves and to have contact with them only along such circular edges or lips with suitable devices for imparting motion to the valves and for preventing leakage around the handle-stem, one object of my invention being, among others, to gain simplicity and durability by obviating the necessity for washers between the valves and valve-seats and to overcome the difficulties which have existed in the use of such valves and seats without washers by making the valve-surfaces conical or tapered in shape and by so arranging each valve-seat that its surface for contact with its valve is reduced to its extreme edge or lip and becomes merely the circumference of a circle.

In the accompanying drawings, Figure 1 is a longitudinal central section of my improved tap in a form most suitable for use as a water-tap, showing two valves closed upon their seats. Fig. 2 is a similar section with the two valves raised from their seats. Fig. 3 is a section in the plane of the axes of the valves at right angles to the plane of Figs. 1 and 2. Fig. 4 is a horizontal section on the plane $x\,x'$ marked on Fig. 2.

Similar letters refer to similar parts throughout the several views.

The casing or shell of the tap A in the drawings is formed much as in an ordinary tap, with an inlet B and an outlet C. The valve-seats are the inner edges or lips of a cylindrical opening D, passing through a flat partition E, which is made, as in the ordinary tap, in one piece with the shell A.

F is an inner valve having a tapered surface toward the valve-seat, as shown, and having projections or lugs G G' working in channels or grooves H H' in the casing or shell, so as to prevent the valve from turning.

J is an outer valve having its surface tapered in the direction of the valve-seat, both valves therefore tapering toward each other.

O is a screw-threaded stem formed in one piece with the inner valve and engaging with a female screw in the apex of the outer valve. A cap L closes the open top of the shell and is held in place by another cap or rim M, which may be screwed down upon the shell. A washer N, of suitable material, such as leather or rubber, may be interposed between the cap L and the shell of the tap. A stem K, made in one piece with the outer valve, passes through a central aperture in the cap L, engaging with it by a screw-thread having a greater number of threads to the inch than there are upon the stem between the two valves. This stem K may be surmounted by a handle P, held in place by the ordinary means.

In assembling the parts the inner valve is inserted in its place through an aperture left, if necessary, for the purpose, and the aperture may be closed or sealed by the cap or plug R, screwed or otherwise fastened in place. The outer valve is then inserted and screwed upon the stem of the inner valve until both valves are drawn close into their seats, as in Fig. 1. The washer N may then be slipped into place, if through imperfect fitting of the caps its use is necessary, and the cap L is then screwed down over it upon the stem K as far as it will go. The cap or rim M is then screwed down firmly over all, and the handle P is fastened upon the projecting stem. Upon turning the handle to open the tap the valves will, on account of the differential screws, rise simultaneously and at an equal rate from their seats, one forward and the other backward, allowing an open passage, and upon closing the tap both valves will approach and reach their seats together, forming a double barrier, the inner valve having an increased effectiveness, in that the pressure of the confined matter is behind it.

The two caps L and M are used so as to allow proper adjustment of the parts when assembling them as above or when adjustment may become necessary on account of possible wear of the valves or valve-seats, all that is necessary in that event being to slightly unscrew and loosen all parts, both caps and valves, then to screw the valves tightly together, to screw the cap L home along the stem passing through it, and then to hold it in the position it may then have taken by screwing the cap or rim M down upon it.

The various parts may be made of any suitable material; but it is intended to make them of metal and preferably of brass on account of its non-corrosive and non-oxidizing qualities. The main objections to the use of metal valves or taps without washers have been the difficulty encountered in making a conical valve fit a conical or tapered seat, the danger from the intervention of dust, grit, or any foreign matter between the valve and its long tapered seat, and the rattling of the parts when a stream of any force passed over them. In my improved valve or tap the valves proper or plugs and valve-seats can much more readily be made to fit each other, as the valve-seats are merely the edges or lips of the cylindrical opening shown and are only to have contact with the valves along the lines of such edges instead of, as in the older form, over an extended tapered surface. Then on account of the valve-seat having no breadth dust and grit will not lodge and interfere, while on account of the manner in which the valves are held and guided no rattling or shaking will take place and the two valves coming simultaneously upon their seats will form a perfect barrier.

It is preferred to use two valves or plugs, as shown, approaching the valve-seats in opposite directions. For each finding its seat independently of the other a perfect barrier is insured; but the principle of my invention is applicable to the use of a single valve, and where a single tapered valve such as shown is used, with a valve-seat also of the form shown in the drawings, the single valve may be placed on either the inner or outer side of the valve-seat and may be raised or depressed by any of the ordinary devices for that purpose now in use.

I am aware that metal valves in metal seats have been used prior to my invention, and I do not claim the mere elimination of washers as patentable, nor, on the other hand, do I, by the express exception of atmospheric air from the claims below suggest any lack of novelty or utility in the invention as applicable to that substance; but I am making an air-valve the subject of a separate application, and

What I claim as new herein, and desire to protect by Letters Patent, is—

1. In a valve or tap for controlling water, steam, or any gas or liquid, other than atmospheric air, the combination of two conical or tapered valves proper or plugs, adapted to approach and recede toward and away from each other, with a valve casing or shell having an inlet and an outlet and bearing a circular valve-seat interposed between said valves proper or plugs and adapted to present to each of them one of its inner circular edges or lips and to have contact with each of them only along the lines of such circular edges or lips, and devices for simultaneously moving the said valves proper or plugs into and from their seats substantially as and for the purposes described.

2. In a valve or tap for controlling water, steam, or any gas or liquid, other than atmospheric air, the combination with a valve shell or casing bearing a valve-seat adapted to present only its inner edges or lips to the valves proper or plugs, of two conical or tapered valves proper or plugs directed toward each other on opposite sides of the said seat and adapted to have contact with the said seat only along the lines of the said edges or lips, devices to prevent the inner valve from turning, a stem upon the inner valve screw-threaded and engaging with a screw-threaded opening in the apex of the outer valve, a stem upon the head of the outer valve cut for part of its length with a screw-thread having a greater number of threads to the inch than that in the first-named stem, an external detachable handle thereon, a cap adapted to press upon and close the end of the said casing, a central aperture in the said cap screw-threaded to correspond with the said stem on said outer valve, and a cap adapted to screw upon the said casing and hold the said first cap in position, all substantially as and for the purposes described.

Kingston, Ontario, July 23, 1900.

HENRY ALFRED WOOD.

In presence of—
BERTHA M. VAN WINCKEL,
FRANCIS KING.